(12) United States Patent
Joshi et al.

(10) Patent No.: US 6,342,991 B1
(45) Date of Patent: Jan. 29, 2002

(54) TOP COVER AIR GATE FOR AN AIR VANE LATCH APPARATUS IN A DISC DRIVE

(75) Inventors: Shantanu Dattatrey Joshi, Fort Collins; Thomas Michael Durrum, Broomfield; Darrel Ray Culver, Longmont, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/472,640

(22) Filed: Dec. 27, 1999

Related U.S. Application Data
(60) Provisional application No. 60/136,578, filed on May 28, 1999.

(51) Int. Cl.[7] .......................... G11B 21/22; G11B 5/54; G11B 33/14
(52) U.S. Cl. .................. 360/256.1; 360/97.02
(58) Field of Search .................. 360/256.1, 256, 360/256.6, 254, 250, 240, FOR 205, 97.02

(56) References Cited

U.S. PATENT DOCUMENTS

| | | | |
|---|---|---|---|
| 4,054,931 A | 10/1977 | Bolton et al. | 360/97.03 |
| 4,130,845 A | 12/1978 | Kulma | 360/97.03 |
| 4,249,221 A | 2/1981 | Cox et al. | 360/97.02 |
| 5,521,776 A | 5/1996 | Mochizuki | 360/97.02 |
| 5,541,791 A | 7/1996 | Yamasaki et al. | 360/256.1 |
| 5,696,649 A | 12/1997 | Boutaghou | 360/97.03 |
| 5,768,057 A | 6/1998 | Fernandes et al. | 360/256.1 |
| 5,768,058 A * | 6/1998 | Hofland | 360/256.1 |
| 5,898,545 A | 4/1999 | Schirle | 360/254.7 |
| 5,907,453 A | 5/1999 | Wood et al. | 360/97.02 |

* cited by examiner

*Primary Examiner*—Hoa T. Nguyen
*Assistant Examiner*—Julie Anne Watko
(74) *Attorney, Agent, or Firm*—John R. Wahl; Merchant & Gould

(57) ABSTRACT

An apparatus for increasing the operative force on an air vane latch apparatus in a disc drive includes an air gate having an elongated rib extending parallel to the air vane immediately downstream of the air vane for reducing pressure behind the air vane during disc drive operation to reduce the disc speed at which the latch apparatus moves from a latched position to an unlatched position. The air gate is preferably a rib extending along an underside surface of the head disc assembly cover positioned parallel to the air vane and immediately downstream.

9 Claims, 4 Drawing Sheets

TOP COVER AIR GATE FOR AN AIR VANE LATCH APPARATUS IN A DISC DRIVE

RELATED APPLICATIONS

This application claims the benefit of priority of U.S. Provisional Patent Application Serial No. 60/136,578 entitled "TOP COVER AIR GATE", filed May 28, 1999.

FIELD OF THE INVENTION

This application relates to magnetic disc drives and more particularly to an apparatus for latching a disc drive actuator mechanism in a parked position when the drive is de-energized and unlatching the actuator mechanism when the drive is energized.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

When the drive is de-energized or shut down, the drive motor stops spinning and the actuator is rotated, for example counterclockwise, to position the heads at an inner radius landing zone location and "park" or latch the actuator in this position. Often a magnetic latch is used to maintain the actuator in this position with the heads "parked" in the landing zone. When a magnetic latch is used, an inadvertent external shock load, such as the drive being dropped, may cause sufficient rotational force to be applied to the actuator arms to overcome the magnetic attraction and thus the actuator arm may rotate from the landing zone to the data region of the discs without the discs spinning at all. This could destroy the stored data on the disc and could destroy the heads themselves. Consequently there is a need for a latch mechanism that ensures that the actuator stays in the park position any time that the disc drive motor is de-energized and, more importantly, when the discs are not spinning.

This de-energized latching at low disc spin rates has been traditionally accomplished by a wind operated latching mechanism which utilizes wind generated by the spinning discs while the drive motor is energized to push against a pivoting air filter member positioned adjacent the outer margin of the discs. This air filter member has a pivot portion, an air filter portion, and an elongated air vane which extends outward over the top disc in the disc stack. The air vane is pushed against by the air drawn along the surface of the disc. At the other end of the pivot portion latching mechanism is an elongated latch arm for engaging the actuator and a tab portion which carries a steel ball therein. The steel ball in the tab portion is positioned in the magnetic field generated by the VCM magnets and thus biases the latch counterclockwise such that the latch arm interferes with movement of the actuator arm off of the magnetic latch when the drive is de-energized and the actuator arm arrives at the park position with the coilform of the VCM against the magnetic latch.

The operation of this conventional latch mechanism is completely automatic, driven only by the VCM magnet magnetic field bias when the discs are stopped, and the force exerted by wind against the air filter and air vane in opposition to the magnetic field bias when the discs are spinning at normal speed. The size and placement of the steel ball on the tab portion are dictated by the requirement that the latch be disengaged when the discs are operating at full speed and engaged when the discs are turning at less than full operating speed with the actuator arm moved into the parked position.

The conventional air vane design has worked well for drives with three or four or more operating discs in the head disc assembly (HDA). However, in the case of drives designed for four discs and having only one or two discs installed, there have been cases where the air vane latch failed to move to the disengaged position when the drive was energized, thus preventing actuator movement and appearing to the user by the software as a disc crash or disc drive failure. In these cases, the failures appear to have occurred at high altitudes such as above 5,000 feet. Accordingly, there is a need for a magnetic wind operated latching apparatus for use in disc drives having only one or two discs which automatically disengages the actuator arm when the disc drive motor spins the discs at operating speed and engages the actuator arm when the disc or discs spin at less than operating speed and the actuator arm is in the parked position in a head disc assembly (HDA) designed to accommodate up to four or more discs.

SUMMARY OF THE INVENTION

Against this backdrop the present invention has been developed. The present invention is an air gate for an air vane air filter latch apparatus having an air vane adapted to extend over the upper surface of a top disc on the disc drive motor. The air gate is a rib protruding toward the air vane from the underside of the HDA cover. This arrangement provides an additional moment arm on the pivoting air filter and latch that becomes important when only one or two discs are located on the drive motor in the HDA. This air gate improves the opening speed of the air vane and its position causes a low pressure region directly behind the air vane. This effectively increases the pressure differential across the air vane causing a higher drag force on the air vane, which results in a lower opening speed, thus providing an additional margin for positive operation of the latch when the disc is rotating at normal rotational speed. This air gate also permits a larger steel ball to be utilized in the latch apparatus thereby ensuring more positive latch and unlatch operations of the apparatus.

These and various other features as well as advantages which characterize the present invention will be apparent from a reading of the following detailed description and a review of the associated drawings.

DETAILED DESCRIPTION

Figure 1:
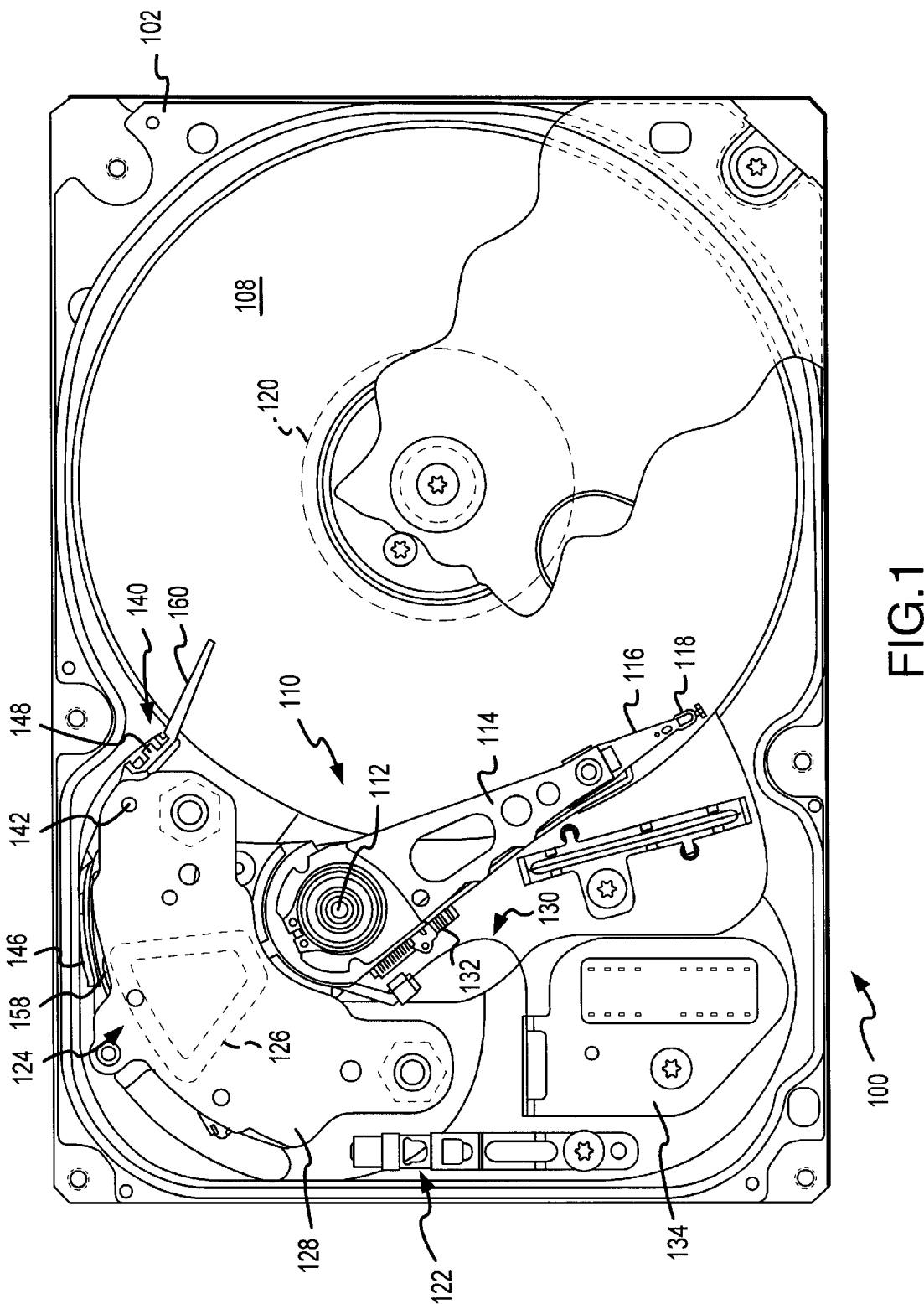
FIG. 1 is a plan view of a disc drive incorporating a top cover air gate apparatus in ccordance with a preferred embodiment of the invention with the head disc assembly cover partially removed.
Figure 2:
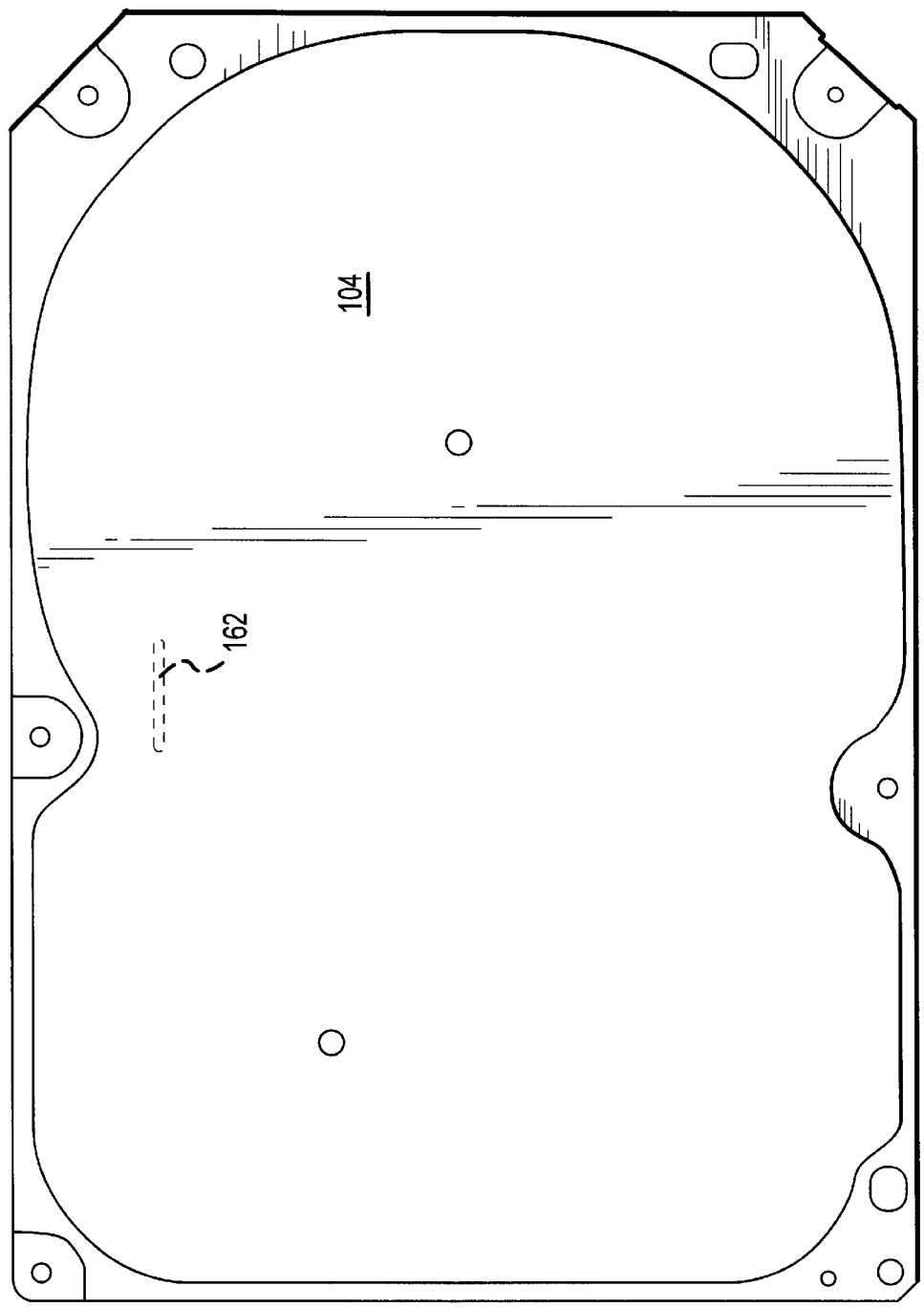
FIG. 2 is a plan view of a cover for the disc drive shown in FIG. 1 with the air gate apparatus in accordance with the present invention shown in dashed lines.

A disc drive 100 constructed in accordance with a preferred embodiment of the present invention is shown in a plan view with portions broken away in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. This assembly is called a head disc assembly (HDA) 101. The components include a spindle motor 106 that rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider enabling the head 118 to fly in close proximity adjacent the corresponding surface of the associated disc 108.

The spindle motor 106 is typically de-energized when the disc drive 100 is turned off or not in use for extended periods of time. The heads 118 are moved to a park zone 120 near the inner diameter of the discs 108 when the drive motor is de-energized. The heads 118 are secured in the park position through the use of an actuator latch arrangement 122, which prevents inadvertent rotation of the actuator arms 114 when the heads are parked, and, when the drive 100 is de-energized and the spin motor is not rotating the discs 108, also by a pivoting air vane air filter and latch apparatus 140 described in further detail below.

The radial position of the heads 118 is controlled through the use of a voice coil motor (VCM) 124, which typically includes a coil 126 attached to the actuator assembly 110, as well as one or more permanent magnets 120 on return plates 128 which are spaced apart. The magnets and return plates establish a vertical magnetic field between the magnets in which the coil 126 is immersed and suspended for rotation in a horizontal plane between the magnets. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a preamplifier printed circuit board 132 to which head wires (not shown) are connected; the head wires being routed along the actuator arms 114 and the flexures 116 to the heads 118. The preamplifier printed circuit board 132 typically includes circuitry for controlling the write currents applied to the heads 118 during a write operation and for amplifying read signals generated by the heads 118 during a read operation. The flex assembly 130 terminates at a flex bracket 134 for communication through the base plate 102 to a disc drive printed circuit board (not shown) mounted to the bottom side of the disc drive 100.

Figure 3:
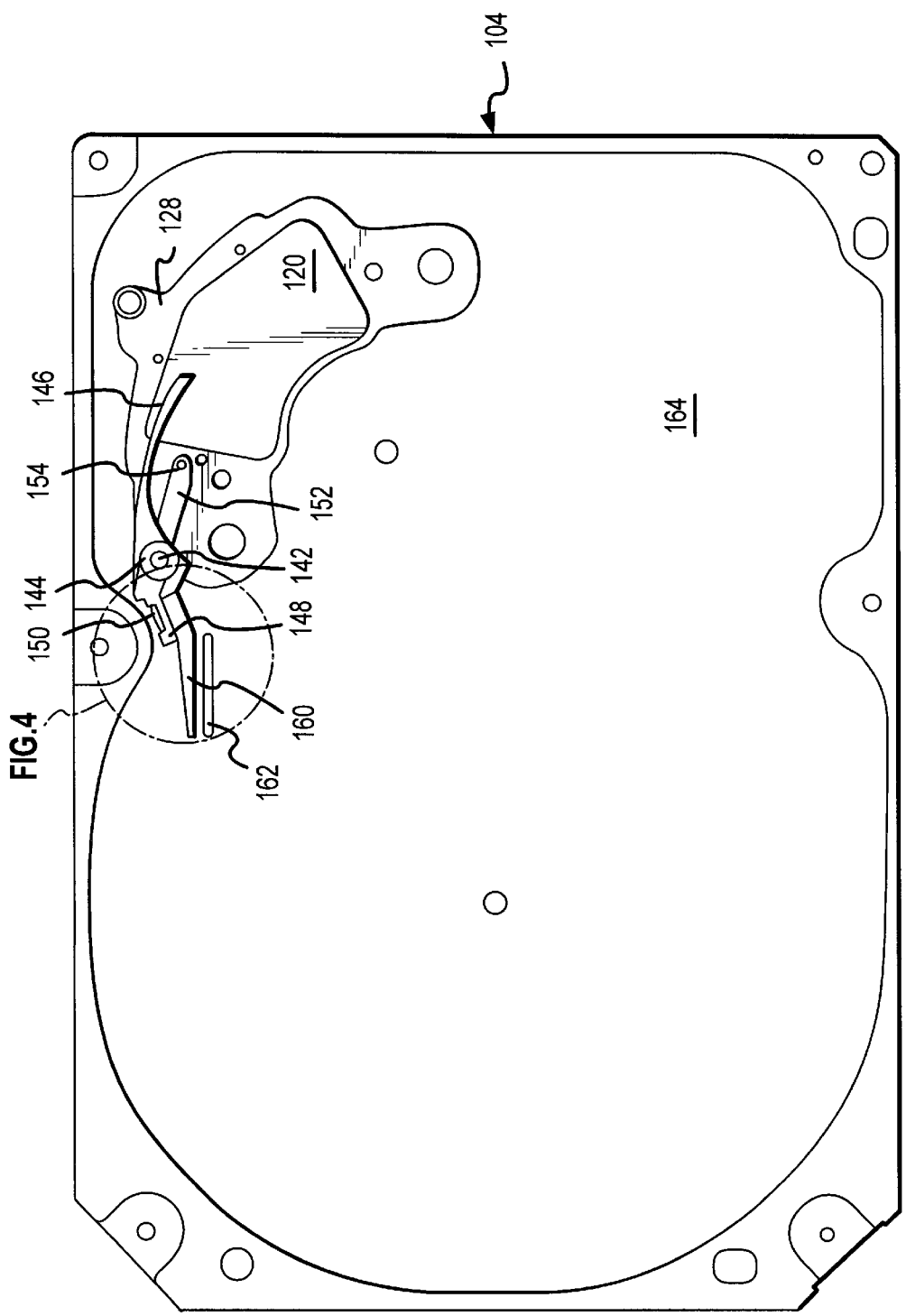
FIG. 3 is a plan view of the inside of the cover shown in FIG. 2 showing the air vane air filter latch apparatus and top plate of the voice coil motor magnet assembly as it would appear when fully assembled in the disc drive.

A pivoting air vane air filter and latch apparatus 140 is pivotally supported on a pin 142 projecting from the upper magnet return plates 128. The latch apparatus 140 is shown in FIG. 1 rotated clockwise to a disengaged position as would be the case when the drive 100 is at normal operation with the discs 108 rotating at normal speed. In FIG. 3, the apparatus 140 is shown in greater detail. Here, the apparatus 140 is mounted on the upper return plate 128 which has been placed in the cavity of the cover 104 in a position as it would appear if viewed from inside the HDA from the upper disc 108. The latch apparatus 140 has a central pivot portion 144, a latch member extending from one side of the central pivot portion 144, and a air filter bracket 148 extending from the other side of the central pivot portion 144.

The filter bracket 148 forms an open rectangular frame support for a sheet of air filter media 150. A generally flat, tapered biasing arm member 152 extends from the central portion 144 so that its tip 154 extends into the magnetic field generated by the VCM magnets 126 when the apparatus is installed on the pivot pin 142. A steel ball 156 is mounted adjacent the tip 154 in the biasing arm 152. This ball 156 is in the magnetic field and is located on the biasing arm 152 a predetermined distance from the axis of the pivot portion 144.

The magnetic field of the VCM interacts with the ball 156 to provide a torque on the apparatus 140 in a counterclockwise direction, as viewed from the top as in FIG. 1. Thus the apparatus 140 is constantly biased toward engagement of the latch arm 146 with the actuator coil overmold 158 to prevent movement of the actuator assembly 110 off of the magnetic latch 122 when it is latched, i.e. in a parked position.

Extending laterally from the top of the air filter bracket 148 over the top disc 108 is an elongated air vane member 160. This air vane acts as a "sail" in any wind generated by the disc 108 spinning on the spin motor 106. When the disc 108 spins, wind is generated by friction between the disc surface and the adjacent air. This wind is most pronounced adjacent the rim of the disc 108, hence the placement of the air filter 148 adjacent the rim of the disc 108. The air vane member 160 extends over an outer portion of the upper surface of the disc 108 so as to catch the wind generated during operation of the disc drive 100. This wind exerts a force on the air vane member 160 which counters the magnetic force exerted by the VCM magnets on the bias arm 152, and exceeds the bias torque when the disc 108 reaches operating speed.

Figure 4:
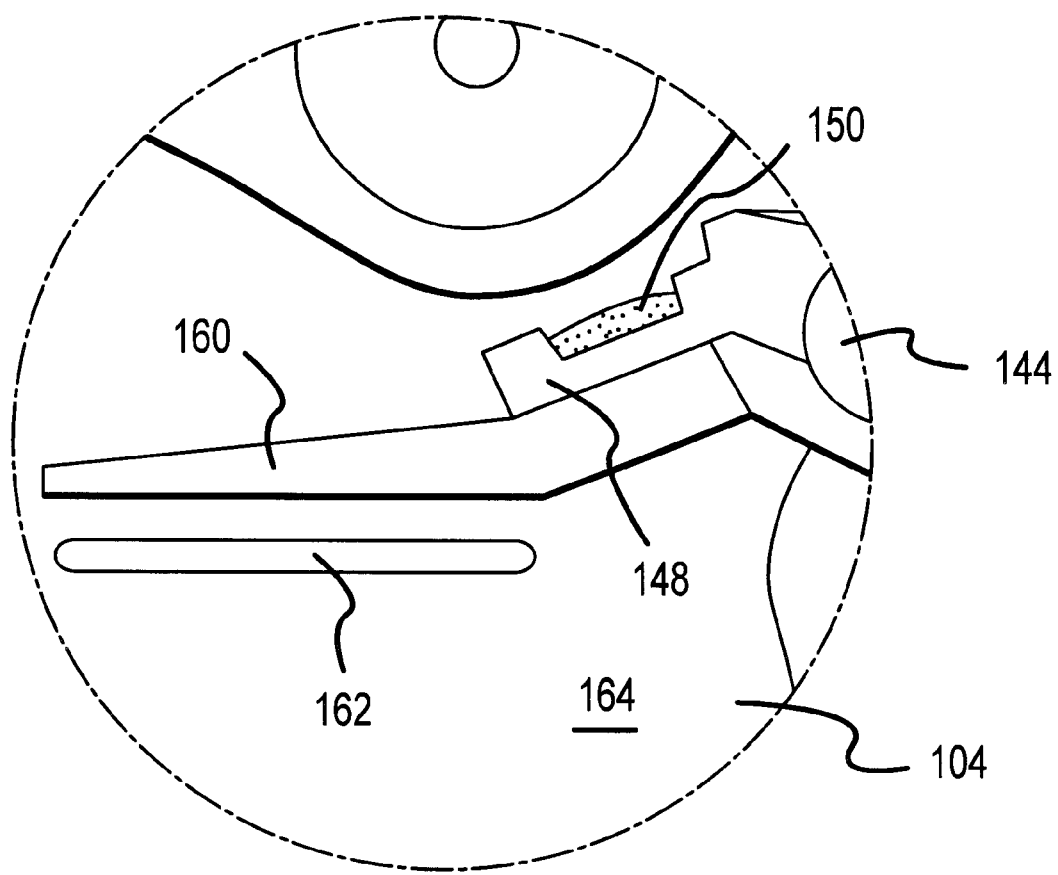
FIG. 4 is an enlarged view of the circled portion in FIG. 3.

Referring now particularly to FIG. 4, just behind the air vane member 160 is positioned an air gate 162. The air gate 162 is an elongated rib projecting from the underside surface 164 of the cover 104. The shape of the gate 162 is preferably about as long as the air vane member 160. In general, an object placed in a flowing fluid (the wind) experiences two types of drag forces: friction drag and pressure drag. The friction drag is a function of the surface area of the body in the direction of flow and the viscosity of the flowing fluid. The pressure drag is a function of the surface area of the object perpendicular to the flow direction and the pressure differential across the upstream and downstream ends of the object. For an air vane latch, the surface area of the air vane in the direction of flow is very small and hence the friction drag can be neglected. The total drag force then mainly consists of pressure drag. Thus, for a given air vane geometry the opening speed, i.e. the disc speed at which the latch opens, can be reduced by increasing the pressure differential across the air vane 160. The air gate 162 is preferably located approximately parallel to the air vane 160, downstream from the air vane 160.

Experimentally it has been determined that the optimal placement of the air gate 162 is as shown in FIGS. 3 and 4. The height of the air gate 162 is preferably between 0.4 and 0.8 millimeters. The lateral distance between the nominal position of the air vane 160 and the air gate 162 parallel to the air vane 160 may be between 0.2 millimeters and 1.5 millimeters and is preferably spaced about 1 millimeter behind the air vane 160, i.e. downstream from the air vane about 1 millimeter. This configuration yields an opening of the air vane air filter latch apparatus 140 at about 76 hertz compared to a normal operational opening speed of about 90 hertz. Stated another way, the presence of the air gate 162 behind the air vane 160 lowers the speed at which the air vane and air filter latch apparatus 140 from about 90 hertz (5400 revolutions per minute) to about 76 hertz (4560 revolutions per minute). This lowering of opening speed essentially represents an increase in the rotational torque applied to the latch apparatus 140 up to and including at a normal operating speed of 90 hertz.

In summary, a preferred embodiment of the invention is an air gate (such as 162) for increasing torque applied to a wind operated air vane air filter and latch apparatus (such as 140) in a disc drive (such as 100). The disc drive (such as 100) has a base plate (such as 102), a spin motor (such as 106) mounted on the base plate rotatably carrying one or more discs (such as 108) thereon, an actuator assembly (such as 110) adjacent the disc (such as 108) for positioning an actuator arm (such as 114) over a portion of the disc, and a cover (such as 104) on the base plate (such as 102) covering the disc (such as 108), the spin motor (such as 106), and the actuator assembly (such as 110). The latch apparatus (such as 140) has a pivoting latch member (such as 146) extending from one side of a central pivot portion (such as 144), an air filter support bracket (such as 148) extending from another side of the central pivot portion (such as 144), and an air vane member (such as 160) extending from the air filter support bracket (such as 148) above a portion of the disc (such as 108). The air gate has a rib member (such as 162) projecting from an underside surface (such as 164) of the top cover (such as 104) above the air vane member (such as 160).

The rib member (such as 162) is spaced from the air vane member (such as 160) in a direction of rotation of the disc (such as 108). More particularly, the rib member is positioned parallel to the air vane member and is spaced between 0.5 millimeters and 1.5 millimeters from the air vane member (such as 160) so as to generate a region of low pressure immediately behind the air vane member (such as 160), thus increasing the wind generated torque applied to the latch apparatus (such as 140) reducing the disc rotational speed at which the latch apparatus (such as 140) rotates from a latched position to an unlatched position.

The present invention may also be viewed as a disc drive (such as 100) having a data storage disc (such as 108) rotatably mounted on a spin motor (such as 106) fastened to a baseplate (such as 102), an actuator assembly (such as 110) mounted adjacent the data storage disc for rotating an actuator arm (such as 114) over a portion of the disc (such as 108), and a cover (such as 104) on the baseplate (such as 102) enclosing the spin motor (such as 106), disc (such as 108) and the actuator assembly (such as 110). The disc drive (such as 100) has an air vane air filter and latch apparatus (such as 140) for keeping the actuator apparatus (such as 140) in a park position until disc rotational speed reaches a normal speed during drive startup. The latch apparatus (such as 140) has a unitary body with a pivot portion (such as 144) rotatably mounted in the disc drive (such as 100) adjacent the disc (such as 108) on a stationary pivot pin (such as 142).

A latch arm member (such as 146) extends from one side of the pivot portion (such as 144) toward the actuator assembly (such as 110) for engaging a portion of the actuator assembly (such as 110). An air filter bracket (such as 148) extends from another side of the pivot portion (such as 144) for holding an air filter (such as 150) in a path of wind generated by the rotating disc (such as 108). An air vane member (such as 160) extends from the bracket (such as 148) over a portion of the disc (such as 108) in the path of wind generated by the disc as it is rotated by the spin motor (such as 106), and an elongated air gate rib (such as 162) extending downward along an underside surface (such as 164)of the cover (such as 104) above the air vane member (such as 160) for reducing the disc spin speed at which the air vane air filter and latch apparatus (such as 140) moves to an unlatched position from a latched position. The rib (such as 162) extends along the underside of the cover (such as 104) parallel to the air vane member (such as 160) and is preferably spaced behind the air vane member (such as 160). This spacing is preferably between 0.5 and 1.5 millimeters from the air vane member.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, this increased torque provided by the air gate 162 permits the size of the ball 156 to be increased, which increases the counter torque generated by the VCM magnets on the latch apparatus 140. Such an increase in ball size may be desirable in order for the latch apparatus 140 to more positively move between a latched and unlatched position. The air gate 162 may be made by adhesively bonding a rib to the underside of the cover 104, indenting the cover 104 to form the rib as in a draw operation during cover formation. The air gate 162 may be straight or curved, although a straight gate configuration is preferred. Accordingly, all such modifications, changes and alternatives are encompassed in the spirit of the invention disclosed and as defined in the appended claims.

What is claimed is:

1. An air gate for increasing torque applied to a wind operated air vane air filter and latch apparatus in a disc drive having a base plate, a spin motor mounted on the base plate rotatably carrying a disc thereon, an actuator assembly adjacent the disc for positioning an actuator arm over a portion of the disc, and a cover on the base plate covering the disc, the spin motor, and the actuator assembly, wherein the latch apparatus has a pivoting latch member extending from one side of a central pivot portion for engaging a portion of the actuator assembly, an air filter support bracket extending from another side of the central pivot portion for holding an air filter in a path of wind generated by the disc rotating on the spin motor, and an air vane member extending from the air filter support bracket above a portion of the disc in the path of the wind generated by the rotating disc, the air gate comprising:

a rib member projecting from an underside surface of the top cover above the air vane member downward toward the air vane member operable to increase a pressure differential across the air vane.

2. The air gate according to claim 1 wherein the rib member is spaced from the air vane member in a direction of rotation of the disc.

3. The air gate according to claim 2 wherein the rib member is positioned parallel to the air vane member.

4. The air gate according to claim 3 wherein the rib member is spaced between 0.5 millimeters and 1.5 millimeters from the air vane member.

5. A disc drive having a data storage disc rotatably mounted on a spin motor fastened to a baseplate, an actuator assembly mounted adjacent the data storage disc for rotating an actuator arm over a portion of the disc, and a cover on the baseplate enclosing the spin motor, the disc and the actuator assembly, the disc drive comprising:

an air vane air filter and latch apparatus having a unitary body with a pivot portion rotatably mounted in the disc drive adjacent the disc on a stationary pivot pin, a latch arm member extending from one side of the pivot portion toward the actuator assembly for engaging a portion of the actuator assembly, an air filter bracket extending from another side of the pivot portion for holding an air filter in a path of wind generated by the disc, and an air vane member extending from the bracket over a portion of the disc in the path of the wind, and an elongated air gate rib extending downward along an underside surface of the cover above and toward the air vane member operable to increase a pressure differential across the air vane to reduce the disc spin speed at which the air vane air filter and latch apparatus moves to an unlatched position from a latched position.

6. The disc drive according to claim 5 wherein the rib extends along the underside of the cover parallel to the air vane member.

7. The disc drive according to claim 5 wherein the rib is spaced behind the air vane member.

8. The disc drive according to claim 7 wherein the rib is spaced between 0.5 and 1.5 millimeters from the air vane.

9. A disc drive having a data storage disc rotatably mounted on a spin motor fastened to a baseplate, an actuator assembly mounted adjacent the data storage disc for rotating an actuator arm over a portion of the disc, and a cover on the baseplate enclosing the spin motor, the disc and the actuator assembly, the disc drive comprising:

an air vane air filter and latch apparatus having an air vane member in a path of wind generated by the disc rotating at a normal operating speed, and an air gate means extending downward toward the air vane member along an underside surface of the cover above the air vane member operable to increase a pressure differential across the air vane for reducing the disc spin speed at which the air vane air filter and latch apparatus moves to an unlatched position from a latched position.

* * * * *